United States Patent
Kwon et al.

(10) Patent No.: US 7,340,756 B2
(45) Date of Patent: Mar. 4, 2008

(54) OPTICAL PICKUP ACTUATOR HAVING FLUX SHIELDING MAGNET, OPTICAL PICKUP EMPLOYING THE OPTICAL PICKUP ACTUATOR AND OPTICAL DISC DRIVE APPARATUS EMPLOYING THE OPTICAL PICKUP

(75) Inventors: Myung-sik Kwon, Gyeonggi-do (KR); Jung-gug Pae, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 279 days.

(21) Appl. No.: 10/652,613

(22) Filed: Sep. 2, 2003

(65) Prior Publication Data

US 2004/0107427 A1  Jun. 3, 2004

(30) Foreign Application Priority Data

Sep. 2, 2002  (KR) ............................. 2002-52504

(51) Int. Cl.
*G11B 7/09* (2006.01)
(52) U.S. Cl. ................................... 720/683
(58) Field of Classification Search ................ 720/683, 720/682, 681, 672, 658
See application file for complete search history.

(56) References Cited

U.S. PATENT DOCUMENTS

2002/0150002 A1* 10/2002 Pae et al. ................ 369/44.16

2004/0177365 A1* 9/2004 Takeshita et al. ........... 720/683

FOREIGN PATENT DOCUMENTS

| JP | 09330532 | 12/1997 |
|---|---|---|
| JP | 10-116428 | 5/1998 |
| JP | 10241198 | 9/1998 |
| JP | 2000-076673 | 3/2000 |
| JP | 2000251295 | 9/2000 |
| JP | 2000293874 | 10/2000 |
| JP | 2002-208146 | 7/2002 |

OTHER PUBLICATIONS

Office Action dated Oct. 11, 2005 from the Japanese Patent Office.

* cited by examiner

*Primary Examiner*—Julie Anne Watko
(74) *Attorney, Agent, or Firm*—Staas & Halsey LLP

(57) ABSTRACT

An optical pickup actuator having a flux shielding magnet, an optical pickup employing the optical pickup actuator, and an optical disc drive apparatus employing the optical pickup. The optical pickup actuator includes: a blade holding the objective lens; coils installed to the blade; and a base having a plurality of driving magnets interacting with a current flowing through the coils and generating a force that drives the blade in a predetermined direction, a shielding magnet arranged opposite to, and having a same polarity facing at least one of the driving magnets, the shielding magnet blocking leakage of magnetic flux from the driving magnets, and a holder having a surface to which the shielding magnet is attached and to which the blade is movably attached.

25 Claims, 5 Drawing Sheets

OPTICAL PICKUP ACTUATOR HAVING FLUX SHIELDING MAGNET, OPTICAL PICKUP EMPLOYING THE OPTICAL PICKUP ACTUATOR AND OPTICAL DISC DRIVE APPARATUS EMPLOYING THE OPTICAL PICKUP

CROSS-REFERENCE TO RELATED APPLICATION

This application claims the benefit of Korean Patent Application No. 2002-52504, filed on Sep. 2, 2002, in the Korean Intellectual Property Office, the disclosure of which are incorporated herein by reference.

BACKGROUND OF THE INVENTION

1. Field of the Invention

The present invention relates to an optical pickup actuator, an optical pickup, and an optical disc drive apparatus, and more particularly, to an optical pickup actuator blocking leakage magnetic flux, an optical pickup employing the actuator, and an optical disc drive apparatus employing the pickup.

2. Description of the Related Art

An optical pickup actuator is used in an optical recording apparatus for recording and reproducing data on an optical disc. As optical recording apparatuses become smaller and compact disc access time becomes shorter, an optical pickup actuator having a lower height and a faster follow-up speed is desired. Also, new optical pickup actuators should be designed to allow use of existing optical discs such as CDs and DVDs. Such an optical pickup actuator should have the same, or wider, operation range as existing optical pickup actuators to satisfy the aforementioned requirement.

Leakage magnetic flux generated in a magnet, installed in an optical pickup actuator, interacts with current to produce a nonuniform thrust force in the optical pickup actuator. This nonuniform thrust force causes negative resonance in the optical pickup actuator which increases as the access time of the optical pickup actuator decreases. As defined herein, negative resonance means an unstable operation of an optical disc caused by resonance at natural frequencies of the optical disc and the optical pickup actuator.

FIG. 1 is an exploded perspective view of a conventional asymmetric optical pickup actuator. Referring to FIG. 1, the conventional optical pickup actuator includes first and second magnets 11a and 11b, yokes 13a and 13b in which the first and second magnets 11a and 11b are fixed, and a base 15 on which the yokes 13a and 13b are installed. A focusing coil 12 and tracking coils 16 interact with the first and second magnets 11a and 11b and generate electromagnetic force. A blade 17 is provided so that the focusing coil 12 and the tracking coils 16 interact with the first and second magnets 11a and 11b. An objective lens 19 is seated on the blade 17, and a suspension 18 supports the blade 17.

FIG. 2 shows magnetic field lines around the first and second magnets 11a and 11b and the focusing coil 12 of the optical pickup actuator shown in FIG. 1.

Focusing and tracking operations of the optical pickup are performed by an electromagnetic force F resulting from an interaction of the first and second magnets 11a and 11b, installed in the yokes 13a and 13b, with the focusing coil 12 and the tracking coils 16, installed on the blade 17. The electromagnetic force is given by Equation 1 below:

$$\vec{F} = \vec{IL} \times \vec{B} \quad (1)$$

$\vec{F}$ is the electromagnetic force vector measured in Newtons (N), $\vec{I}$ is the vector current measured in Amperes (A), $\vec{L}$ is the length of a section of the coil affected by the magnetic field measured in meters (m), and $\vec{B}$ is a magnetic field vector in the region of the section of coil measured in Tesla (T).

The optical pickup actuator performs a focusing operation to read or record data on an optical disc and operates within an operational range so as to follow-up the optical disc when the optical disc is disturbed. During the follow-up operation, the optical pickup actuator moves upward and downward with respect to a plane of the base 15. The electromagnetic force that acts on the focusing coil 12 and the blade 17 is generated by a magnetic field B and current I due to current flowing through a coil positioned between the first and second magnets 11a and 11b, as shown in Equation 1. In order to drive the optical pickup actuator in a focusing direction, it is preferable that magnetic flux only exists between the first and second magnets 11a and 11b. However, in conventional actuators, magnetic flux also leaks behind the second magnet 11b, thereby causing negative resonance.

Such leakage magnetic flux generated from an N pole of the second magnet 11b shown in FIG. 2 interacts with current flowing through a section of the focusing coil 12 placed behind the second magnet 11b with respect to the objective lens. Due to this leakage magnetic flux, a nonuniform electromagnetic force is generated in the focusing direction, thereby causing negative resonance in the optical pickup actuator. Due to the negative resonance in the optical pickup actuator, the optical pickup operates unstably, and the overall performance of an optical disc drive apparatus is lowered.

SUMMARY OF THE INVENTION

The present invention provides an optical pickup actuator blocking leakage magnetic flux such that an unstable operational factor such as negative resonance occurring due to a nonuniform thrust force is lessened, an optical pickup employing the optical pickup actuator, and an optical disc drive apparatus employing the optical pickup.

According to an aspect of the present invention, an optical pickup actuator is provided. The optical pickup actuator includes a blade with a mounted objective lens for condensing light onto an optical disc, and wound coils. A base includes a plurality of driving magnets, interacting with current flowing through the coils, to generate force that drives the blade in a predetermined direction. A shielding magnet, arranged opposite to and has the same polarity as at least one of the driving magnets, blocks leakage magnetic flux from the driving magnets.

According to another aspect of the present invention, an optical pickup is provided. The optical pickup includes an optical pickup actuator having a blade on which an objective lens for condensing light onto an optical disc is mounted, and wound coils. A base includes a plurality of driving magnets interacting with current flowing through the coils to generate a force that drives the blade in a predetermined direction. A shielding magnet is arranged opposite to, and has the same polarity, as at least one of the driving magnets, so as to block leakage magnetic flux from the driving magnets. The optical pickup also includes an optical system which includes the objective lens and a light source for radiating light through the objective lens.

According to another aspect of the present invention, an optical disc drive apparatus is provided. The optical disc drive apparatus includes an optical pickup including an optical pickup actuator having a blade on which an objective lens for condensing light onto an optical disc is mounted, and in which coils are wound. A base includes a plurality of driving magnets interacting with current flowing through the coils to generate a force that drives the blade in a predetermined direction and a shielding magnet, arranged opposite to, and has the same polarity, as at least one of the driving magnets, to block leakage magnetic flux from the driving magnets. A slider is mounted at one end of the optical pickup actuator and forms an air bearing with the optical disc to provide lift. The apparatus also includes an optical disc rotating unit rotating the optical disc at a predetermined speed, a driving unit driving the optical pickup and the optical disc rotating unit, and a control unit controlling focusing and tracking servos of the optical pickup.

According to an aspect of the present invention, the base comprises a holder to which the shielding magnet is attached, and a plurality of yokes to which the plurality of driving magnets are fixed. The blade can include a plurality of guide holes into which the plurality of driving magnets are inserted. The coils comprise a focusing coil wound to generate an electromagnetic force in a focusing direction and tracking coils wound to generate an electromagnetic force in a tracking direction. The base includes a suspension, one end of which is coupled with the holder and the other end connected to, and movably supporting the blade.

Additional aspects and advantages of the invention will be set forth in part in the description which follows and, in part, will be obvious from the description, or may be learned by practice of the invention.

BRIEF DESCRIPTION OF THE DRAWINGS

These features, and/or other aspects and advantages of the invention will become apparent and more readily appreciated from the following description of the preferred embodiments taken in conjunction with the accompanying drawings in which.

DETAILED DESCRIPTION OF THE INVENTION

Figure 1:
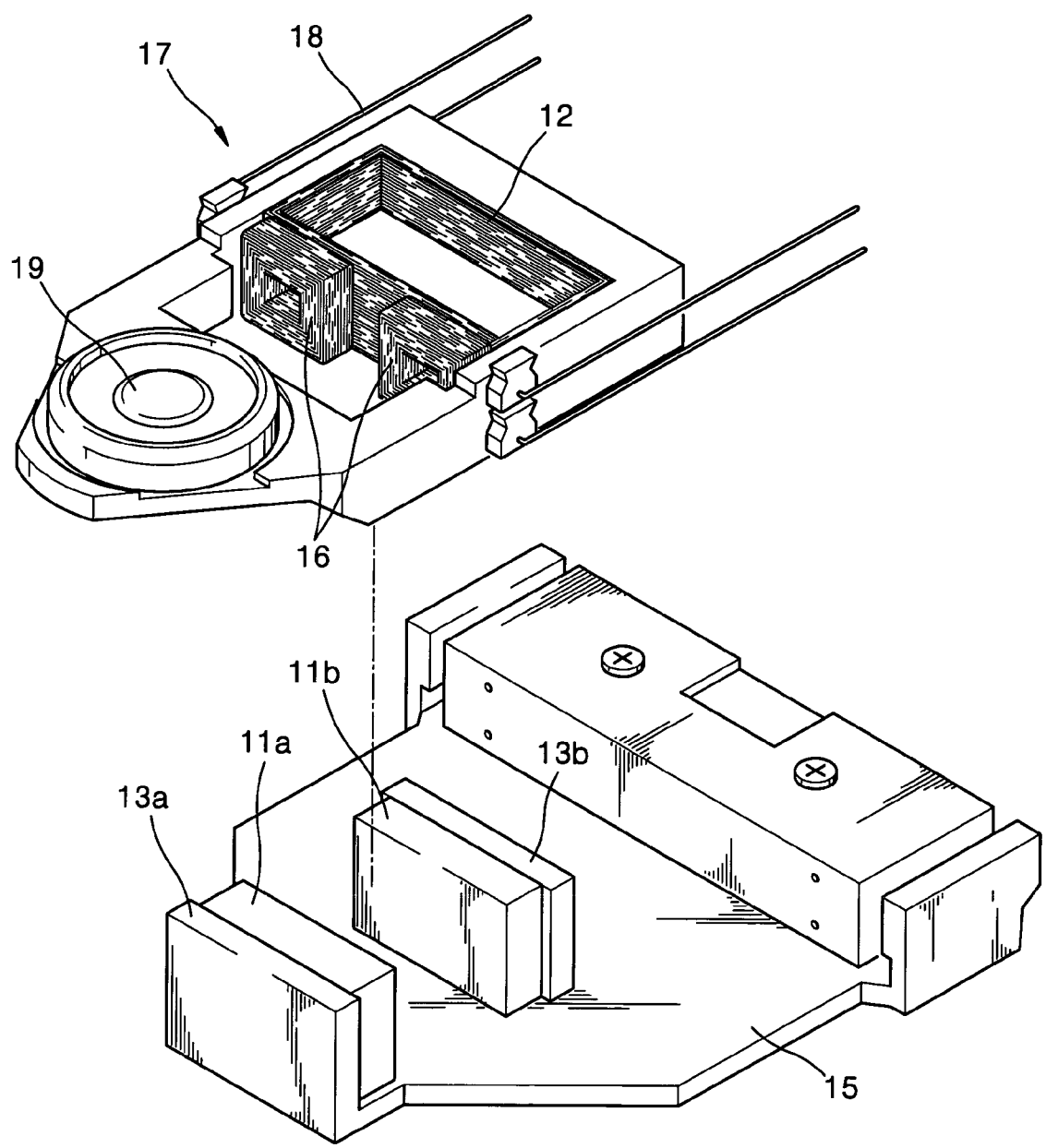
FIG. 1 is an exploded perspective view of a conventional optical pickup actuator.
Figure 2:
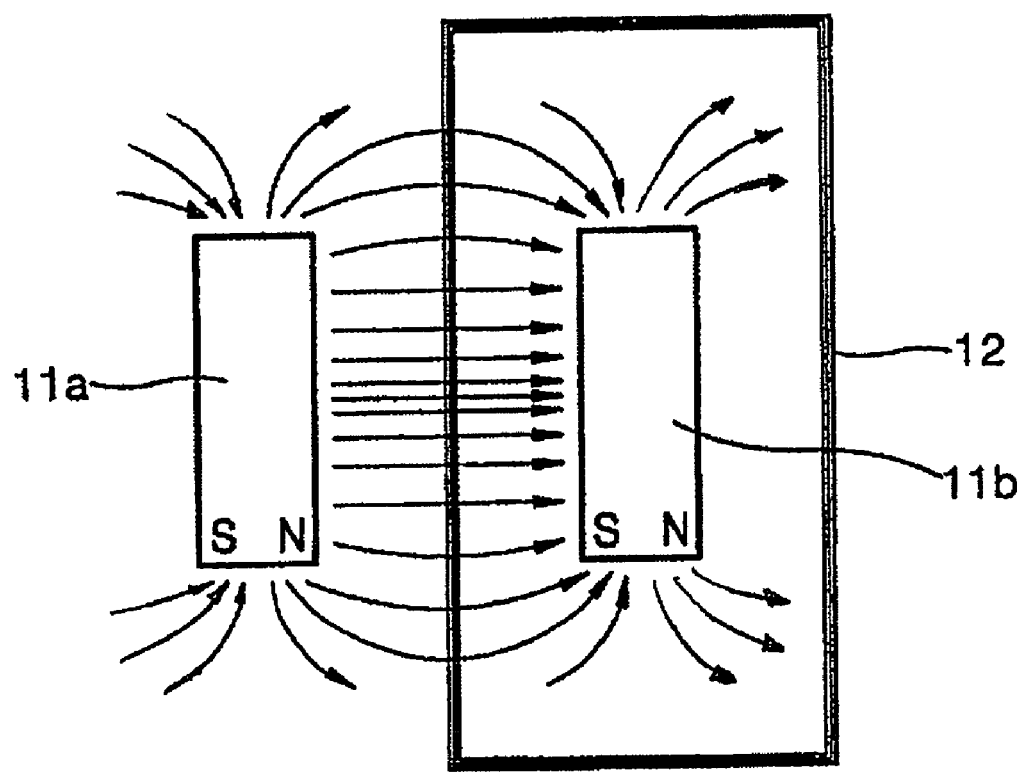
FIG. 2 shows magnetic field lines around magnets and a coil installed in the conventional optical pickup actuator of FIG. 1.

Reference will now be made in detail to the preferred embodiments of the present invention, examples of which are illustrated in the accompanying drawings wherein like reference numerals refer to the like elements throughout. The embodiments are described below in order to explain the present invention by referring to the figures.

Figure 3:
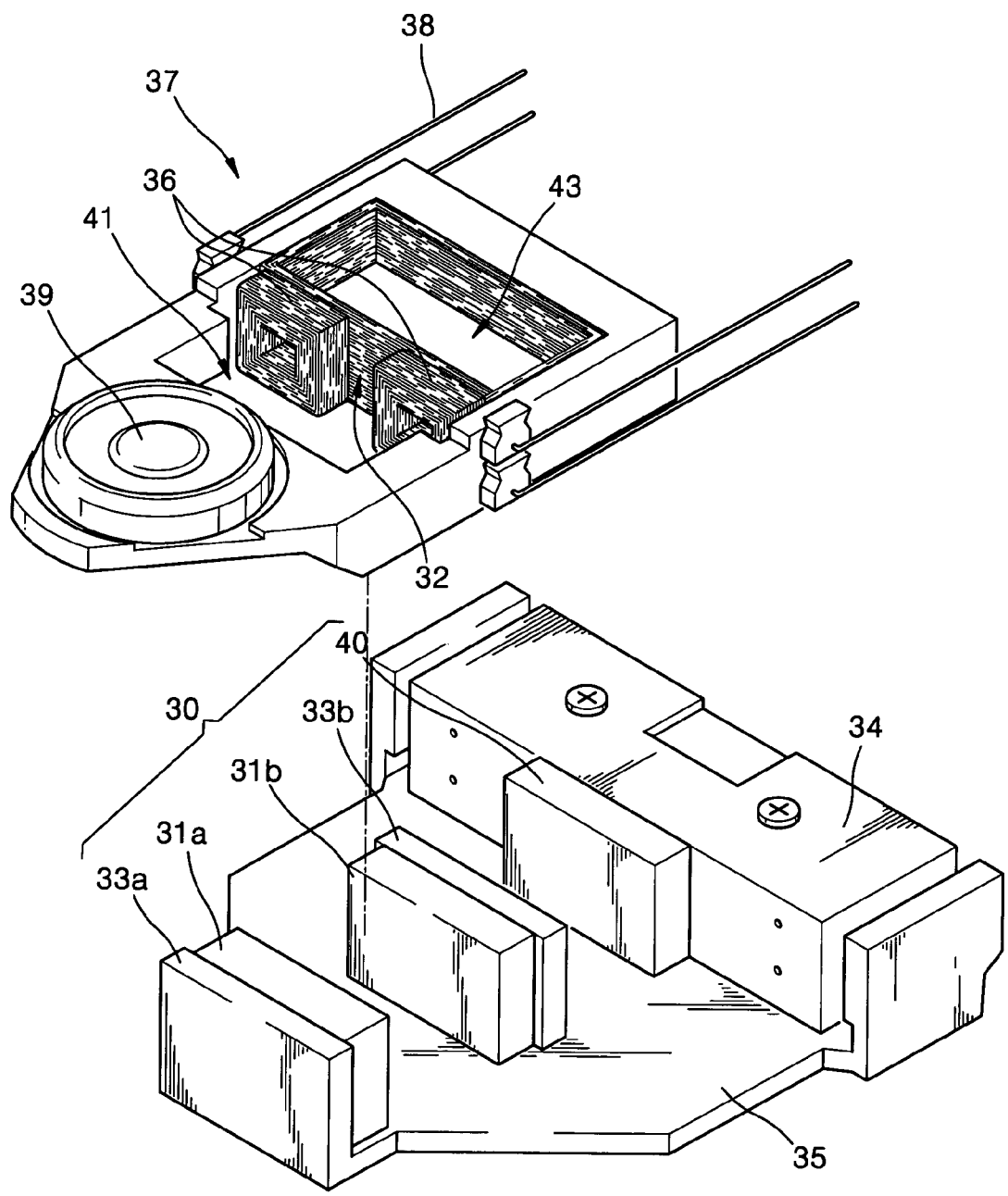
FIG. 3 is an exploded perspective view of an embodiment of an optical pickup actuator according to an embodiment of the present invention.
Figure 4:
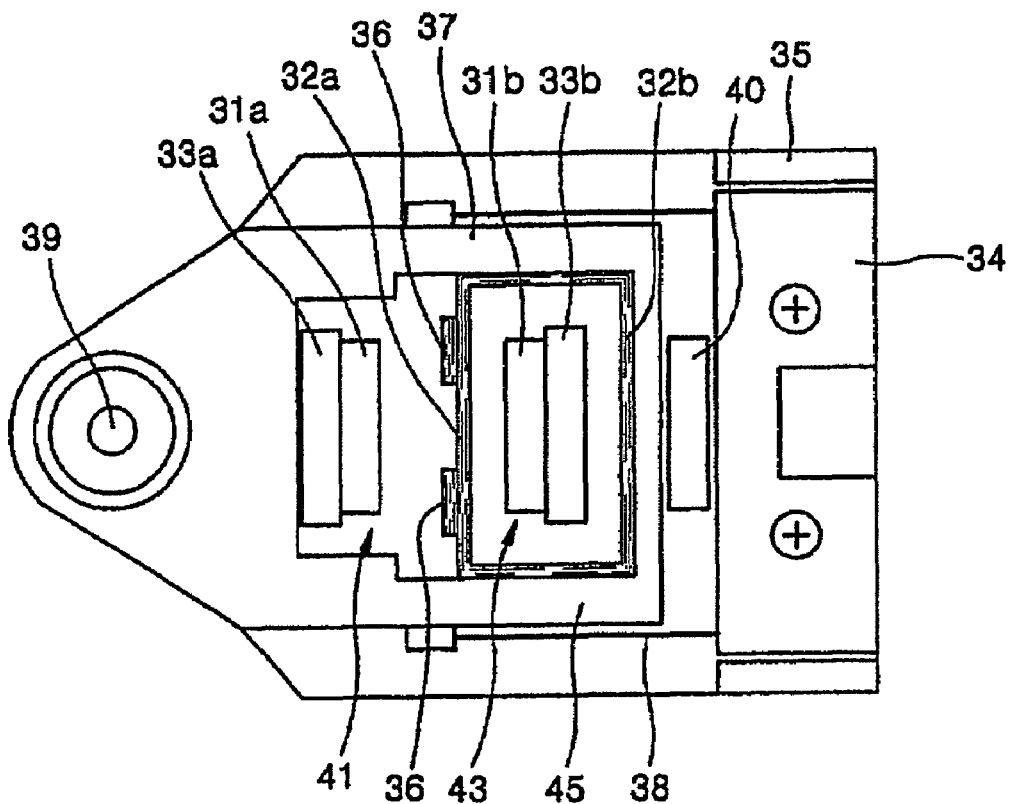
FIG. 4 is a plan view of the optical pickup actuator shown in FIG. 3.

FIG. 3 is an exploded perspective view of an embodiment of an optical pickup actuator according to one aspect of the present invention, and FIG. 4 is a plan view of the optical pickup actuator shown in FIG. 3.

Referring to FIGS. 3 and 4, the optical pickup actuator comprises a base 35 and a blade 37. A holder 34 is formed at one side of the base 35, and a magnetic driving part 30 is formed at the other side of the base 35. The blade 37 is coupled with the base 35 and an objective lens 39 is seated on a side of the blade 37 opposite to the holder 34.

The magnetic driving part 30 includes first and second yokes 33a and 33b fixed to the base 35, first and second magnets 31a and 31b attached to the first and second yokes 33a and 33b, and a separate shielding magnet 40 near the holder 34 to shield an ineffective section of the focusing coil from magnetic flux which leaks from the second magnet 31b.

First and second guide holes 41 and 43 are formed in the blade 37, a focusing coil 32 is installed around an interior surface of the second guide hole 43, and tracking coils 36 are disposed at one side of the focusing coil 32.

Referring to FIG. 4, the focusing coil 32 includes an effective section 32a, between the first and second magnets 31a and 31b and an ineffective section 32b crossing a back side of the second magnet 31b. Current flowing through the effective section 32a interacts with the magnetic field formed between the first and second magnets 31a and 31b resulting in a force in a focusing direction according to Equation 1. However, current flowing through the ineffective section 32b interacts with only minor magnetic flux leaking in the second magnet 31b, causing a nonuniform thrust force. That is, the current flowing through the ineffective section 32b, which is not used to drive the optical pickup actuator in the focusing direction, causes unstable negative resonance in the optical pickup actuator.

Thus, one feature of the present invention is that the shielding magnet 40 is attached to the holder 34 opposite to the second magnet 31b so as to shield the ineffective section 32b from leakage magnetic flux. Here, the second magnet 31b and the shielding magnet 40 should have the same polarity.

Figure 5:
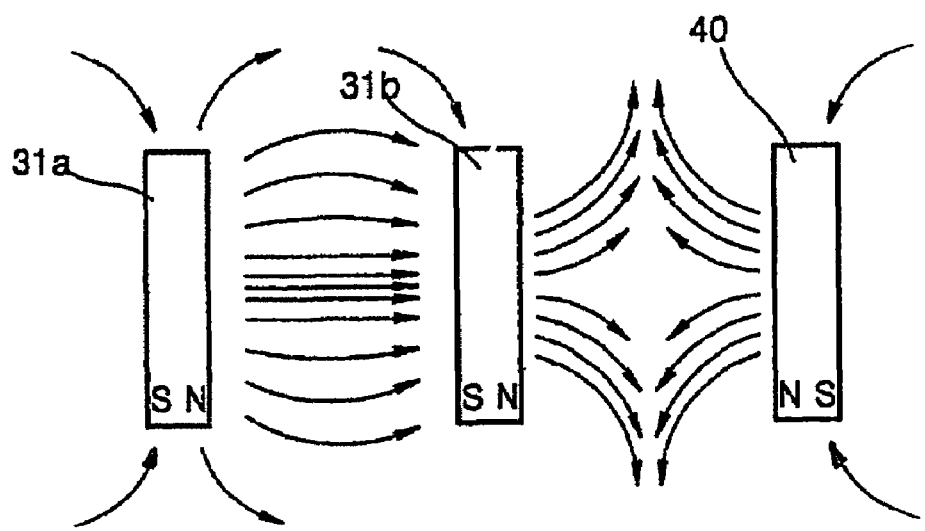
FIG. 5 shows the distribution of magnetic field lines around magnets installed in the optical pickup actuator of FIG. 3.

FIG. 5 shows the distribution of magnetic field lines around the first and second magnets 31a and 31b and the shielding magnet 40. Referring to FIG. 5, the first and second magnets 31a and 31b are positioned so as to have opposite polarities facing each other and magnetic field lines going from an N pole of the first magnet 31a to an S pole of the second magnet 31b. On the other hand, the second magnet 31b and the shielding magnet 40 are arranged to have the same polarity facing each other and magnetic field lines from N poles of the second magnet 31b and the shielding magnet 40 and are mutually deflected away from the center of the space between the first and second magnets 31a and 31b, parallel to the ineffective section 32b of the focusing coil 32 (not shown in FIG. 5). As is known from Equation 1, when the magnetic field is perpendicular to the current, a maximum force is generated, and when the magnetic field is parallel to the current, no resultant force is generated. Thus, as shown in FIG. 5, the magnetic field formed between the second magnet 31b and the shielding magnet 40 does not affect the ineffective section 32b of the focusing coil 32 crossing this area.

That is, the optical pickup actuator according to the an embodiment of the present invention further includes the shielding magnet 40 positioned behind the second magnet 31b such that the effect of leakage magnetic flux on the ineffective section 32b of the focusing coil 32 is minimized.

The optical pickup actuator according to an embodiment of the present invention is advantageous for use as a slim and lightweight asymmetric optical pickup actuator of a portable type.

Figure 6:
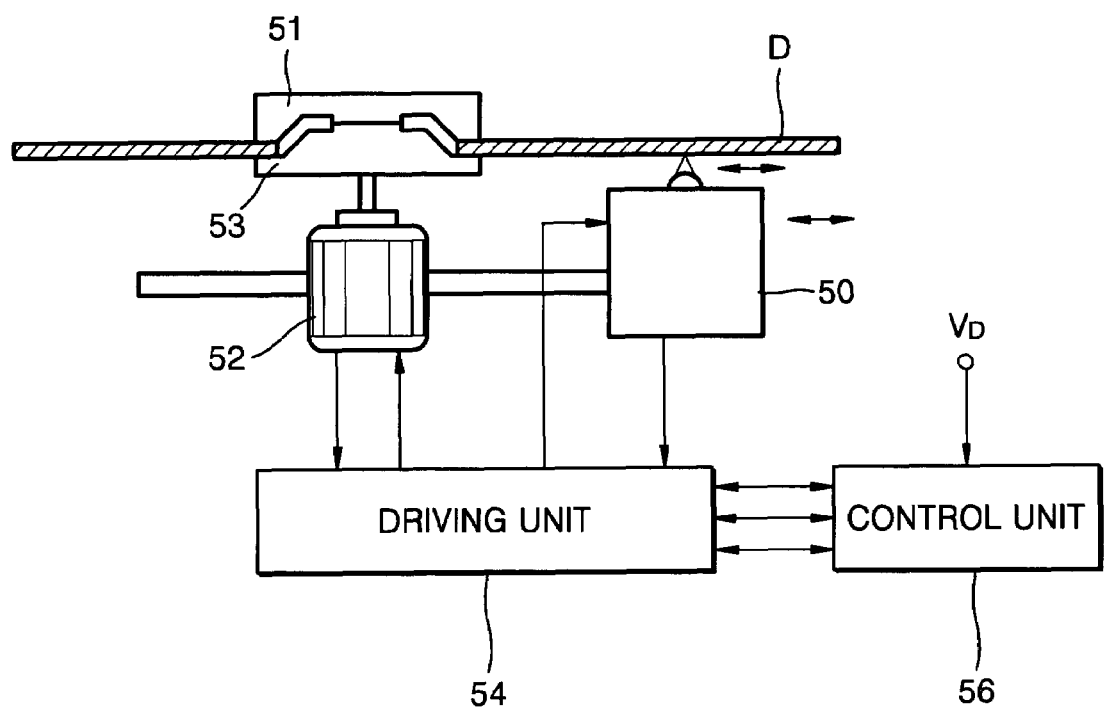
FIG. 6 schematically shows an embodiment of an optical disc drive apparatus according to the present invention.

FIG. 6 schematically shows an embodiment of an optical disc drive apparatus according to the present invention. Referring to FIG. 6, the optical disc drive apparatus includes a spindle motor 52 rotating an optical disc D, an optical pickup 50 movable in a radial direction of the disc D and reproducing information recorded on the disc D or recording information on the disc D, a driving unit 54 driving the spindle motor 52 and the optical pickup 50, and a control unit 56 which controls focusing and tracking servos of the optical pickup 50.

The optical pickup 50 includes an objective lens, an optical system having a light source for radiating light through the objective lens, and an actuator on which the objective lens is seated and driven in focusing and tracking directions. Reference numerals 53 and 51 denote a turntable on which the disc D is mounted, and a clamp which secures the disc D.

A signal detected from the optical pickup 50 and photo-electrically converted, is input into the control unit 56 through the driving unit 54. The driving unit 54 controls a rotational speed of the spindle motor 52, amplifies the input signal and drives the optical pickup 50. The control unit 56 transmits instructions for controlling the focusing and tracking servos, which are based on the signal input from the driving unit 54, to the driving unit 54 so as to perform focusing servo and tracking servo operations.

In the optical pickup actuator according to an embodiment of the present invention, negative resonance caused by leakage magnetic flux is minimized such that the optical pickup actuator has stable dynamic characteristics. As such, the optical pickup can smoothly operate on various kinds of optical discs, and the reproducing and recording performance of the optical disc drive apparatus, in which the optical pickup actuator is mounted, is improved. In addition, defects occurring during a process for manufacturing an optical pickup actuator can be reduced, and jitter also can be reduced.

Although a few embodiments of the present invention have been shown and described, it would be appreciated by those skilled in the art that changes may be made in this embodiment without departing from the principles and spirit of the invention, the scope of which is defined in claims and their equivalents.

What is claimed is:

1. An optical pickup actuator for an objective lens condensing light onto an optical disc, comprising:
   a blade holding the objective lens;
   coils installed to the blade; and
   a base comprising:
   a plurality of driving magnets interacting with a current flowing through the coils and generating a force that drives the blade in a predetermined direction,
   a shielding magnet arranged opposite to, and having a same polarity facing at least one of the driving magnets, the shielding magnet blocking leakage of magnetic flux from the driving magnets, and
   a holder having a surface to which the shielding magnet is attached and to which the blade is movably attached.

2. The actuator of claim 1, wherein the base further comprises:
   a plurality of yokes to which the plurality of driving magnets are fixedly attachable.

3. The actuator of claim 2, wherein the blade further comprises a plurality of guide holes into which the plurality of driving magnets are insertable.

4. The actuator of claim 2, wherein the base further comprises a suspension, one end of which is coupled with the holder and the other end of which is connected to movably support the blade.

5. The actuator of claim 1, wherein the blade further comprises a plurality of guide holes into which the plurality of driving magnets are insertable.

6. The actuator of claim 1, wherein the coils comprise:
   a focusing coil wound to generate an electromagnetic force in a focusing direction, and
   tracking coils wound to generate an electromagnetic force in a tracking direction.

7. The actuator according to claim 6, wherein walls of the focusing coil define a cavity, one of the driving magnets being positioned inside the cavity and another of the driving magnets being positioned outside the cavity, and the shielding magnet being positioned outside the cavity on another side of the focusing coil than the driving magnet.

8. An optical pickup for use with an optical disc, comprising:
   an optical pickup actuator for an objective lens condensing light onto the optical disc, wherein the optical pickup actuator comprises:
   a blade holding the objective lens,
   coils installed to the blade, and
   a base comprising:
   a plurality of driving magnets interacting with a current flowing through the coils and generating a force that drives the blade in a predetermined direction,
   a shielding magnet arranged opposite to and having a same polarity facing at least one of the driving magnets, the shielding magnet blocking leakage of magnetic flux from the driving magnets, and
   a holder having a surface to which the shielding magnet is attached and to which the blade is movably attached; and
   an optical system,
   wherein the optical system comprises:
   the objective lens, and
   a light source radiating light through the objective lens.

9. The pickup of claim 8, wherein the base further comprises:
   a plurality of yokes to which the plurality of driving magnets are fixedly attachable.

10. The pickup of claim 9, wherein the blade further comprises a plurality of guide holes into which the plurality of driving magnets are insertable.

11. The pickup of claim 9, wherein the base further comprises a suspension, one end of which is coupled with the holder and the other end of which is connected to movably support the blade.

12. The pickup of claim 8, wherein the blade further comprises a plurality of guide holes into which the plurality of driving magnets are insertable.

13. The pickup of claim 8, wherein the coils comprise a focusing coil wound to generate an electromagnetic force in a focusing direction and tracking coils wound to generate an electromagnetic force in a tracking direction.

14. The pickup of claim 13, wherein walls of the focusing coil define a cavity, one of the driving magnets being positioned inside the cavity and another of the driving magnets being positioned outside the cavity, and the shielding magnet being positioned outside the cavity on another side of the focusing coil than the driving magnet.

15. An optical disc drive apparatus, comprising:
an optical pickup, comprising:
an optical pickup actuator for an objective lens condensing light onto an optical disc, wherein the optical pickup actuator comprises:
a blade holding the objective lens,
coils installed to the blade, and
a base comprising:
a plurality of driving magnets interacting with a current flowing through the coils and generating a force that drives the blade in a predetermined direction,
a shielding magnet arranged opposite to and having a same polarity facing at least one of the driving magnets and blocking leakage of magnetic flux from the driving magnets,
a holder having a surface to which the shielding magnet is attached and to which the blade is movably attached, and
a slider, mounted at one end of the optical pickup actuator forming an air bearing with the optical disc to provide lift;
an optical disc rotating unit rotating the optical disc at a predetermined speed;
a driving unit driving the optical pickup and the optical disc rotating unit; and
a control unit controlling focusing and tracking servos of the optical pickup.

16. The apparatus of claim 15, wherein the base further comprises:
a plurality of yokes to which the plurality of driving magnets are fixedly attachable.

17. The apparatus of claim 16, wherein the blade further comprises a plurality of guide holes into which the plurality of driving magnets are insertable.

18. The apparatus of claim 16, wherein the base further comprises a suspension, one end of which is coupled with the holder and the other end of which is connected to movably support the blade.

19. The apparatus of claim 15, wherein the blade further comprises a plurality of guide holes into which the plurality of driving magnets are insertable.

20. The apparatus of claim 15, wherein the coils comprise a focusing coil wound to generate an electromagnetic force in a focusing direction and tracking coils wound to generate an electromagnetic force in a tracking direction.

21. The apparatus of claim 20, wherein walls of the focusing coil define a cavity, one of the driving magnets being positioned inside the cavity and another of the driving magnets being positioned outside the cavity, and the shielding magnet being positioned outside the cavity on another side of the focusing coil than the driving magnet.

22. An optical pickup actuator for an objective lens condensing light onto an optical disc and a holder on a base, comprising:
a blade holding the objective lens;
a focusing coil having walls defining a cavity installed to the blade;
first and second yokes mounted to the base;
a first driving magnet positioned on the base and attachable to a side of the first yoke not facing the objective lens;
a second driving magnet positioned in the cavity of the focusing coil and having one side facing the first driving magnet and the other side attachable to the second yoke; and
a shielding magnet positioned on the base having one side facing the second yoke,
wherein the blade is movably connected to the holder, and
wherein the shielding magnet is positioned on a surface to which the blade is attached.

23. The optical pickup actuator according to claim 22, wherein a side of the first driving magnet faces the second driving magnet having an opposite polarity as the facing side of the second driving magnet and the same plurality as the facing side of the shielding magnet.

24. An optical pickup actuator for an objective lens condensing light onto an optical disc and a holder on a base, comprising:
a blade holding the objective lens;
a focusing coil having walls defining a cavity and at least one tracking coil installed to the blade;
a plurality of driving magnets positioned on the base to interact with a current flowing through the coil generating a force driving the blade in a predetermined direction; and
a shielding magnet positioned on the base blocking a leakage of magnetic flux from the driving magnets,
wherein the shielding magnet is attached to a side of a holder to which the blade is attached.

25. The optical pickup actuator according to claim 24, wherein one of the driving magnets is positioned in the cavity of the focusing coil.

* * * * *